INVENTOR
Albert R. van C. Warrington
BY Babcock & Babcock
ATTORNEYS

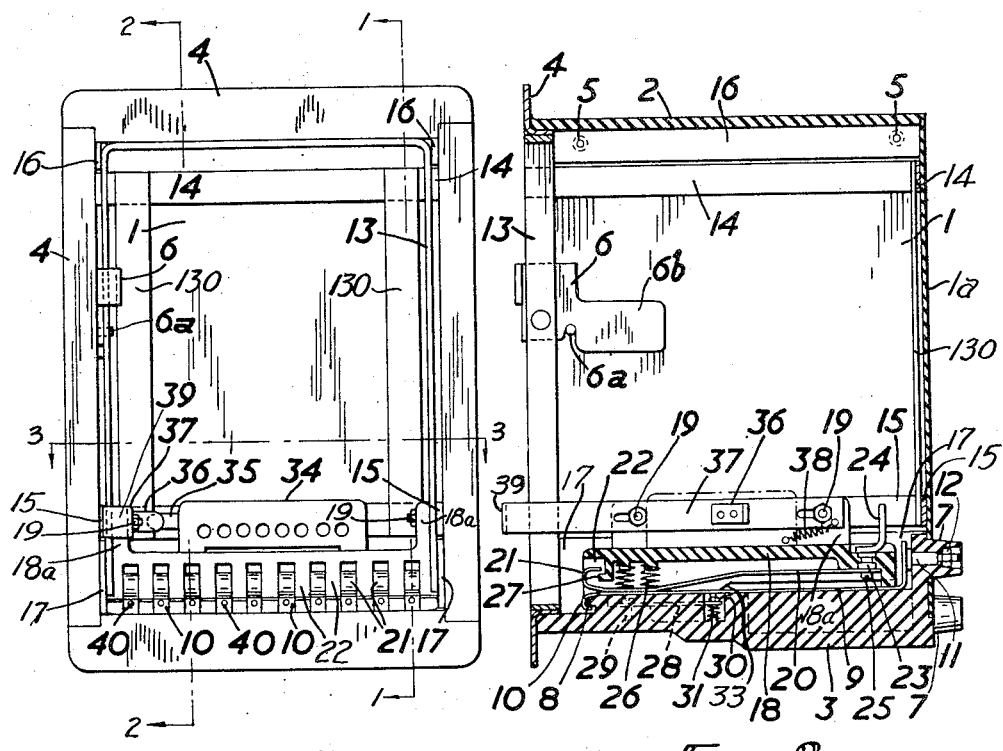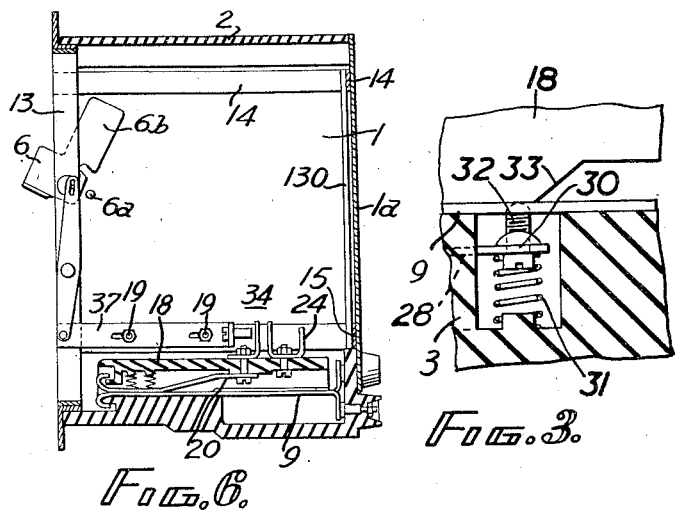

United States Patent Office 2,802,972
Patented Aug. 13, 1957

2,802,972

CASES FOR ELECTRICAL INSTRUMENTS

Albert Russell van Cortlandt Warrington, Stafford, England, assignor to The English Electric Company Limited, London, England, a British company Application February 2, 1953, Serial No. 334,516

Claims priority, application Great Britain February 1, 1952

4 Claims. (Cl. 317—113)

This invention relates to cases for electrical instruments and is primarily applicable to cases for protective relays. It can also be applied, however, to cases for other electrical apparatus, for example, integrating meters.

It is a desirable feature of such a case that the apparatus contained in it should be capable of being withdrawn easily for inspection, maintenance or replacement and to that end cases have been designed in the past in which terminals on the case proper have been connected to apparatus within the case through a series of separable contacts. It is an object of the present invention to provide an improved form of case of this kind.

According to the invention, an electrical instrument case comprises a container having a front opening, an instrument support member housed within said container and withdrawable through said front opening, a set of case contact members carried by said container having contact surfaces adjacent said front opening, a corresponding set of case terminals on said container for connection to external circuits, electrical connection means between each of said case contact members and the corresponding case terminal, a coresponding set of instrumental contact members carried by said instrument support member having contact surfaces directly engaging contact surfaces of corresponding case contact members, a corresponding set of instrument terminals on said support member for connection to an instrument to be supported by said support member, electrical connection means between each of said instrument contact members and the corresponding instrument terminal, resilient means for urging the contact surface of each individual member of one of said sets of contact members into engagement with the contact surface of the corresponding member in the other set, said resilient means being sufficiently resilient and the members of at least one of said sets of contact members being capable of sufficient movement to enable a contact-making probe member to be inserted between the contact surfaces of corresponding instrument contact members and case contact members, location means for locating said instrument support member within said container to ensure the operative co-operation of said sets of contact members, and electrical insulation means insulating from other such units each unit consisting of a contact member, a terminal, and electrical connection means between the two.

Preferably, the co-operating case and instrument contact members are arranged in a row and are supported upon suitable insulating blocks and springs are used to urge the co-operating contact members together. The location of the contact surfaces adjacent the front opening of the container allows the contacts to be easily visible from the front of the container and facilitates tests on the contact pressures.

According to a feature of the invention said case contact members comprise metal contact strips which each have bent-over hook-like portions at one end, and said electrical insulation means includes an insulating block which also forms a part of said container and has, adjacent said front opening, a nose-like portion adapted to locate the contact strips adjacent this opening by engagement with their hok-like portions, there being a positive attachment of the strips to the block at positions along the strips remote from said front opening.

According to another feature of the invention said instrument contact members comprise resilient metal contact strips which each have bent-over hook-like portions at one end, and said electrical insulation means includes an insulating block which forms a part of said support member and has nose-like portions adjacent said front opening of the container, said bent-over hook-like portions on the metal contact strips being adapted to loosely embrace said nose-like portions of the block, and there being a positive attachment of the strips to the block at positions along the strips remote from their bent-over portions.

Where the case is intended for housing a protective relay, a switch is preferably provided in series with tripping contacts of the relay and so arranged as to be automatically opened when a closure for the front opening of the container is removed. This switch is conveniently arranged on the support member and is operated by a slidable spring-loaded bar which projects forward and is normally held against the pressure of the spring by the closure.

According to a further feature of the invention, said case further comprises a switch mounted on the container and connected between two of the case contact members, bias means also mounted on the container adapted to urge the switch to the closed position and switch control means carried by the support member and operative to oppose the action of said bias means when the support member is housed within the container. This switch is particularly useful where the case houses a protective relay. This switch may then be used to short-circuit the secondary of a current transformer when the support member is withdrawn from the container. The switch may consist of a bridging member urged by a spring into engagement with a pair of adjacent case contact members and normally held out of engagement with them by a cam surface formed on an insulating block which is part of the instrument support member and which forms a supporting structure for the instrument contact members.

One form of the invention applicable to a case for a protective relay is illustrated in the accompanying drawings in which:

Fig. 1 is a front elevation view of a case having an instrument support member shown in position within a container.

Fig. 2 is a cross-sectional elevation view of the case shown in Fig. 1 taken on the section line 1—1.

Fig. 3 is an enlarged view of part of Fig. 2.

Figure 5:
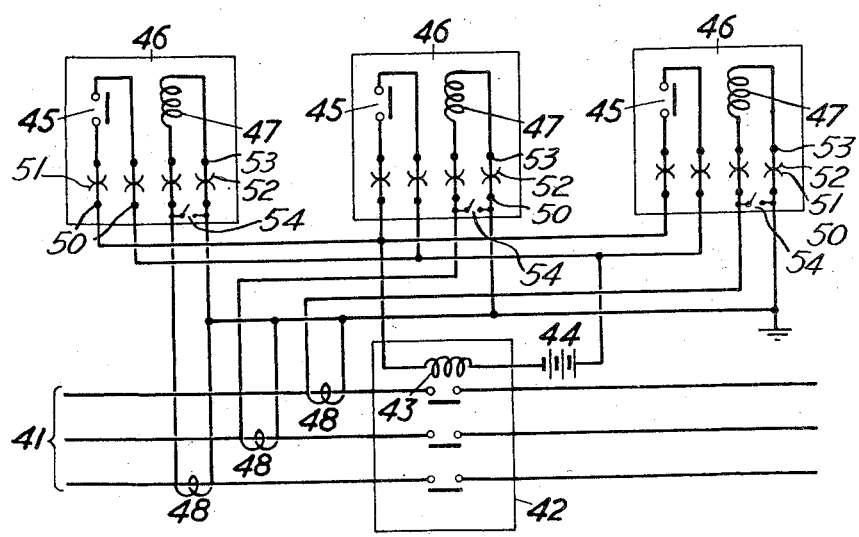

Fig. 5 is a schematic circuit diagram which depicts typical connections required by a protective relay and illustrates how the relay case shown in the other figures may be connected in a circuit, and Fig. 6 illustrates a modification of the case shown in Fig. 1 in which an alternative construction of safety switch is used. This figure corresponds to a cross-sectional elevation view of the case shown in Fig. 1 taken on the section line 2—2.

Referring to Figs. 1 to 4 of the drawings, an electrical instrument case is shown to comprise a container housing an instrument support member and an electrical contact system for connecting terminals on the container (hereinafter referred to as the case terminals) to corresponding terminals on the support member (hereinafter referred to as the instrument terminals).

Figure 4:
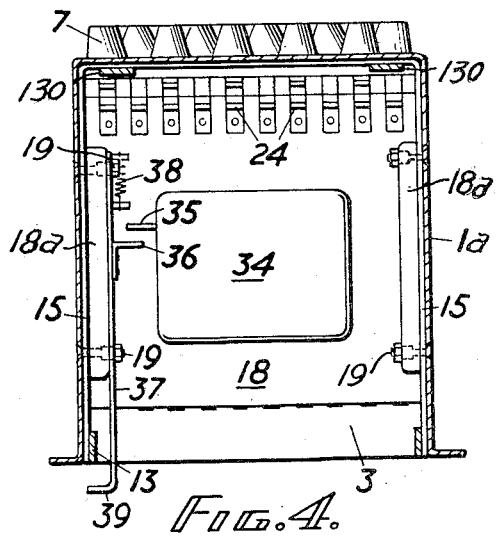
Fig. 4 is a cross-sectional plan view of the case shown in Fig. 1 taken on the section line 3—3.

The container 1 is formed from a U-shaped metal member 1a, shown fully in Fig. 4, and two moulded insulating blocks 2 and 3, shown fully in Fig. 2. The member 1a forms the rear and side walls of the container, whilst the block 2 forms a top closure and the block 3 a bottom closure for the container. Flanges 4 are formed around the front edges of the container by bent-over portions of the member 1a which form side flanges, and special angle-shaped members which form top and bottom flanges. A member (not shown) is adapted to be attached to these flanges to form a closure for the front opening in the container. The block 2 has two side ribs 16 and is secured through these ribs to the member 1a by screws 5. The block 3 having side ribs 17 is similarly secured by screws not shown in the drawings.

The block 3 is provided with terminal shrouds 7 which are conveniently arranged in two rows in staggered relationship. These terminal shrouds project from the rear of the container as shown in Fig. 2, the upper row projecting through holes in metal member 1a and the lower row projecting through a series of semi-circular slots in the lower rear edge of the member 1a. The front edge of the block 3 has a nose-like portion 8 which extends across the block and which lies adjacent the front opening of the container. Ten case contact members formed by conducting metal strips 9 are mounted on the block 3. One end of each strip 9 is bent over to form a hook-like portion 10 which fits over the nose-like portion 8. The other end of each strip 9 is bent over at right angles and is connected to a case terminal in the form of a terminal stud 11, for example, by brazing. There are ten such terminal studs, one for each strip, and they all project through different holes in the rear of the block 3 into corresponding terminal shrouds 7. These studs 11 are secured in place by nuts 12 within the shrouds and form terminals for connection of the case contacts to external circuits. The strips 9 are fully secured when their rear ends are connected to the studs 11 since the hook-like portions 10 are drawn into engagement with the nose-like portion 8. Alternate strips 9 are bent at right angles in opposite directions so that the corresponding studs 11 project alternately into a shroud forming part of the upper row and a shroud forming part of the lower row.

A support member for carrying the instrument to be housed within the container 1 is formed from an inverted U-shaped metal strip 13 which is riveted on each side near the top and bottom to U-shaped metal strips 14 and 15 respectively. The support member has two other metal strips 130 which are connected between the U-shaped strips 14 and 15, joining corresponding corners of the U of each strip. When the support member is inserted into the container 1 the strip 14 is guided by the undersurface of the side ribs 16 on the block 2 and the strips 15 are guided by upper surfaces on the side ribs 17 of the block 3. Besides affording guide surfaces which facilitate the insertion and withdrawal of the support member within and from the container the ribs 16 and 17 constitute location means for locating the support member within the container so as to ensure the operative co-operation of the case and instrument contact members.

The support member may, if desired, be positively secured in position within the container 1 by latches 6 which engage with suitable detents 6a on the inside of container 1.

The instrument contact members are carried by an insulating block 18 which is secured by means of screws 19 to the U-shaped strip 15 in such a position as to overlie the block 3 when the support member is housed in position within container. A set of ten instrument contact members in the form of conducting metal strips 20 is carried by the block 18. The strips 20 are attached to the underface of the block 18 and have positions which correspond to those of the strips 9 on the block 3. The strips 20 are similar to the strips 9 and are each provided at their front ends with a bent-over hook-like portion 21 which is located between guides formed by rib-like separation pieces 22 which are an integral part of the block 18. The strips 20 are brought upwards at their rear ends to brass inserts 23 moulded into the block 18. Here, they are secured to terminal tags 24 by means of screws 25 passing through the inserts 23. The terminal tags 24 form a set of instrument terminals for connection to an instrument (in this case a relay) to be supported by the support member. The screws 25 constitute electrical connections between the instrument contact members, that is the strips 20, and the instrument terminals, and the insulating nature of the block 18 provides the necessary insulation between the units formed by a contact member, a terminal, and the electrical connection between the two. The hook-like portions 21 of the strips 20 loosely embrace nose-like portions 27 of the block 18 formed between the separation pieces 22. Each of the strips 20 is provided with two springs 26 spaced along its length and mounted between the strip and the underface of the block 18. The use of two springs safeguards against the possibility of total failure through spring breakage and also provides a more even distribution of spring pressure along the contact surfaces of the strips 9 and 20. The nose-like portions 27 of the block 18 function as stops which limit the displacement of the strips 20 under the action of the springs 26 when the instrument support member is withdrawn from the container. They also render the strips 20 capable of sufficient movement to allow a contact-making probe member to be inserted between the contact surfaces of the strips 9 and 20.

It will be seen that the invention provides a case which enables electrical apparatus such as a protective relay to be assembled on the support member and simply pushed into position within the case, the necessary connections to external circuits being made automatically on insertion. Furthermore, the contacts through which this is accomplished are readily available for inspection, the springs for these contacts are removable with the support member and, as opposed to that type of relay case in which a connecting plug is used, the use of two separable sets of contacts in series is avoided.

An arrangement of protective relays in a three phase power transmission line is shown diagrammatically in Fig. 5 of the accompanying drawings. With reference to this figure the three phase transmission line 41 incorporates a three phase circuit breaker 42 which has a tripping coil 43 arranged to trip the breaker 42 when a circuit incorporating a battery 44 and a parallel arrangement of tripping switches 45 is closed. Tripping switches 45 are mounted in each of the protective relays 46 and are operated by coils 47 each of which is connected to a different current transformer, there being three such current transformers 48, one in each phase of the line 41. The characteristics of the relay determine whether or not a switch 45 closes in response to the operating condition of the line 41. The cases of the relays 46 are of the form described with reference to Figs. 1 to 4 and the terminal and contact arrangement shown diagrammatically in Fig. 5 by sets of case terminals 50, case contact members 51, instrument contact members 52 and instrument terminals 53, correspond to the terminal and contact arrangement of the case already described. The provision of ten pairs of contacts as shown in Fig. 1 enables a standard design of case to be applied to a variety of purposes, the number used depending upon the nature of the electrical device to be housed within the case. Thus in Fig. 5 when the relays 46 are housed within the cases, six pairs of contacts on each case will have no internal or external connections; only four pairs of contacts are required in each case for the application illustrated in Fig. 5.

When the case is used to house a protective relay which is adapted to respond to signals from the secondary of a current transformer (for example, Fig. 5 illustrates a system in which three cases each house a relay responding to a different current transformer), this secondary should be short-circuited when the relay support member is withdrawn from the container 1 and also it is desirable that a tripping circuit controlled by the relay should be opened before the support member is moved.

With reference to the case shown in Figs. 1 to 4, the first of these conditions may be satisfied by a switch located within the case and arranged so that when the support member is removed from the case the two contacts which are housed within the case itself and which normally connect the current transformer to the relay are short-circuited. This is readily accomplished by the use of a spring biased bridge contact which when the support member is inserted is separated from short-circuiting connections with these two contacts by a cam surface on the support member. In the case illustrated in Fig. 2 (see also the enlarged view shown in Fig. 3) a switch for this purpose is provided on the block 3. It consists of a flexible strip 28 located within a recess in the block 3 and secured at one end to the block by a screw 29. The other end of the strip carries a bridging member 30 which is urged by a spring 31 into engagement with an adjacent pair of contact strips 9. The bridging member 30 has an upstanding spigot 32 which extends between the two adjacent contact strips 9 into the path of a cam surface 33 on the block 18. Thus, when the block 18 is inserted into the container 1, the end of the spigot 32 is engaged by the cam surface 33 and the bridging member 30 is forced out of engagement with the apropriate contact strips. The view shown in Figs. 2 and 3 is taken on the section line 1—1. Thus, said pair of contact strips 9 is the end pair shown in Fig. 1 nearest the right hand side of the case.

It is to be noted that although only one such short-circuiting switch is normally required the design of the case may with convenience be such that the switch may be located between the two strips forming any of the five pairs of strips 9. The moulding forming the block 3 has, therefore, a series of five recesses capable of accepting a strip 28, and the block 18 is provided with cam surfaces 33 formed as part of the rib-like separation pieces 22. Although there are nine such surfaces only five may function as such at any one time.

Each of the relays 46 shown in Fig. 5 includes a short-circuiting switch of the form of that just described. This switch is denoted 54 in Fig. 5 and is shown in the open position to connect the case terminals 50 that are connected to a current transformer 48 in the external circuit.

The requirement that the tripping circuit of a relay should be opened before the support member is removed is rendered desirable by the fact that an operator removing the support member may otherwise inadvertently bump the relay contacts closed while removing the support member and before the contact strips 9 and 20 have separated. To ensure against this it is desirable to incorporate within the relay a switch in series with the tripping circuit. For example, in the system shown in Fig. 5 a switch is required in series with each tripping switch 45. This additional switch must be opened as a preliminary to a withdrawal of the support member from the case. It is advisable, therefore, for this switch to be opened or closed automatically upon attaching or removing the closure for the case. Thus, as shown in Figs. 1, 2 and 4 the case is provided with a suitable mechanism by which a switch can be operated automatically in response to the opening or closure of the case. Owing to the versatility of the case in respect of its potential use for housing various kinds of electrical instrument the electrical connections between this switch and the instrument circuit may have a variety of forms. It suffices, therefore, for the purpose of describing this invention to describe only the mechanism by which a safety switch carried by the support member may be actuated in response to the opening or closure of the case. In the relay application already mentioned, for example, a tripping signal will be communicated to a circuit external to the case through two of the strips 20. The safety switch may, therefore, be applied for the purpose described by including it in the series circuit connecting these strips 20 within the support member. The structure of such a switch is shown schematically in Figs. 1, 2 and 4 at 34. The switch 34 is mounted on the block 18 and is operated by an arm 35 which extends from the switch 34 and is arranged to be engaged by a projection 36 on a sliding member 37. The sliding member 37 is carried by the support member and slides on extensions of the screws 19 which bolt one of the strips 15 to a raised side portion of the block 18. There are two such side portions 18a disposed one on each side of the block 18 as shown in Figs. 1 and 4. The member 37 is urged towards the front of the support member by a spring 38 connected between pins on the relevant side portion 18a and the member 37. The spring normally urges the member 37 so that its end at the front of the support member extends from the mouth of the container 1. In this position the screws 19 engage the ends of mating slots in the member 37. The part of the member 37 which extends from the mouth of the container 1 is bent at right angles as shown at 39. This bent portion 39 is engaged by the closure of the container 1 so as to cause a rearward movement of the projection 36. Thus on closing the container 1 this projection 36 is brought into engagement with the arm 35, displacing the arm to actuate the switch 34. On removal of the closure the member 37 with the projection 36 is moved forward by the spring 38 and the switch 34 is permitted to open.

Alternatively the switch 34 may be mechanically linked to one of the latches 6 so that, when the relay unit is in its case, the trip circuit may be closed when the latch is in the locked position and may be opened when the latch is opened preparatory to sliding the relay unit out of the case, so that it is impossible to remove the unit without first opening the trip circuit. This method has the advantage that the trip circuit may be opened or closed by operating the latch when the relay is in the case, this being convenient for testing the contacts and the continuity of the trip circuit. This alternative arrangement is shown in Fig. 6. In this figure the switch 34 is simply shown as a pair of series contacts in the conductive path formed by one of the strips 20. The view corresponds to a sectional view taken on the line 2—2 in Fig. 1. With this arrangement, however, the latch must be elongated as shown at 6b to prevent undesirable tripping when the relay unit is quickly or roughly pushed into the case with the latches left inadvertently in the locked position. When this happens, movement of the relay unit is suddenly arrested with the result that the tripping contacts of the relay might otherwise be bumped to a closed condition, while the instrument contact members are in engagement with the case contact members. The extensions 6b however, when the latches are in the locked position, obstruct the insertion of the support member into the container and these extensions are of such a size that the obstruction takes place before the support member contacts engage the case contacts.

Having the connecting contacts at the front of the relay not only has the advantage of making them visible and accessible for inspection but also enables the current in any circuit to be checked by means of a test probe inserted between the appropriate pair of contacts. Thus to test the relay it is not necessary to disconnect any terminal connections. For test purposes a thin probe may be inserted between a corresponding pair of contact strips 9 and 20, the probe consisting of a thin strip of insulating material carrying a contact surface on each face, each surface being connected to a separate test terminal on the strip. Such a probe may be used for checking the current in the current transformer or the relay circuit for example. If a test is to be made with secondary current, two such probes may be used or it may be convenient to provide a double probe, but in either case the two terminals on the lower side are short-circuited in order to short circuit the secondary of the current transformer and the two terminals on the upper side are taken to an ammeter and a source of power for voltage measurements; it may be convenient to attach test leads to the contact strips themselves and for this purpose the strips 9 are provided on their hooked portions 10 with threaded holes 40.

If desired, a multiple probe may be provided, having pairs of contact surfaces corresponding in number to the number of interengaging instrument and case contact members and the contact surfaces may be connected by a multi-core cable to a suitable test box.

Reference to switchboard connection diagrams (which are usually complicated and unwieldy) is rendered unnecessary and the testing procedure is greatly facilitated by the provision of a white label on the bottom of the case in front of the contacts marking clearly the function of each, e. g. "current," "potential," "trip," "alarm," etc.

The combination of the features described in the foregoing text provides a relay which can be tested in much less time and with much less hazard due to wrong connections, which might otherwise result in improper operation of the relay when put back into service, or possibly in damage to the relay or injury to the operator.

What I claim as my invention and desire to secure by Letters Patent is:

1. An electrical instrument case comprising a container having a front opening, an instrument support member housed within said container and withdrawable through said front opening, a set of case contact members carried by said container having contact surfaces adjacent said front opening, a corresponding set of case terminals on said container for connection to external circuits, electrical connection means between each of said case contact members and the corresponding case terminal, a corresponding set of instrument contact members carried by said instrument support member having contact surfaces directly engaging contact surfaces of corresponding case contact members, a corresponding set of instrument terminals on said support member for connection to an instrument to be supported by said support member, electrical connection means between each of said instrument contact members and the corresponding instrument terminal, resilient means for urging the contact surface of each individual member of one of said sets of contact members into engagement with the contact surface of the corresponding member in the other set, said resilient means being sufficiently resilient and the members of at least one of said sets of contact members being capable of sufficient movement to enable a contact-making probe member to be inserted between the contact surfaces of corresponding instrument contact members and case contact members, location means for locating said instrument support member within said container to ensure the operative co-operation of said sets of contact members, and electrical insulation means insulating from other such units each unit consisting of a contact member, a terminal, and electrical connection means between the two.

2. An electrical instrument case according to claim 1, wherein said case contact members comprise metal contact strips which each have bent-over hook-like portions at one end, and said electrical insulation means includes an insulating block which also forms a part of said container and has, adjacent said front opening, a nose-like portion adapted to locate the contact strips adjacent this opening by engagement with their hook-like portions, there being a positive attachment of the strips to the block at positions along the strips remote from said front opening.

3. An electrical instrument case according to claim 1, wherein said instrument contact members comprise resilient metal contact strips which each have bent-over hook-like portions at one end, and said electrical insulation means includes an insulating block which forms a part of said support member and has nose-like portions adjacent said front opening of the container, said bent-over hook-like portions on the metal contact strips being adapted to loosely embrace said nose-like portions of the block, and there being a positive attachment of the strips to the block at positions along the strips remote from their bent-over portions.

4. An electrical instrument case according to claim 1, which further comprises a switch mounted on the container and connected between two of the case contact members, bias means also mounted on the container adapted to urge the switch to the closed position and switch control means carried by the support member and operative to oppose the action of said bias means when the support member is housed within the container.

References Cited in the file of this patent

UNITED STATES PATENTS

| | | |
|---|---|---|
| 1,429,275 | Burnham | Sept. 19, 1922 |
| 2,286,044 | West et al. | June 9, 1942 |
| 2,498,807 | Hagenback | Feb. 28, 1950 |
| 2,530,945 | Chapman et al. | Nov. 21, 1950 |